W. S. FOX.
ATTACHMENT FOR MOWING MACHINES.
No. 10,990. Reissued Mar. 12, 1889.
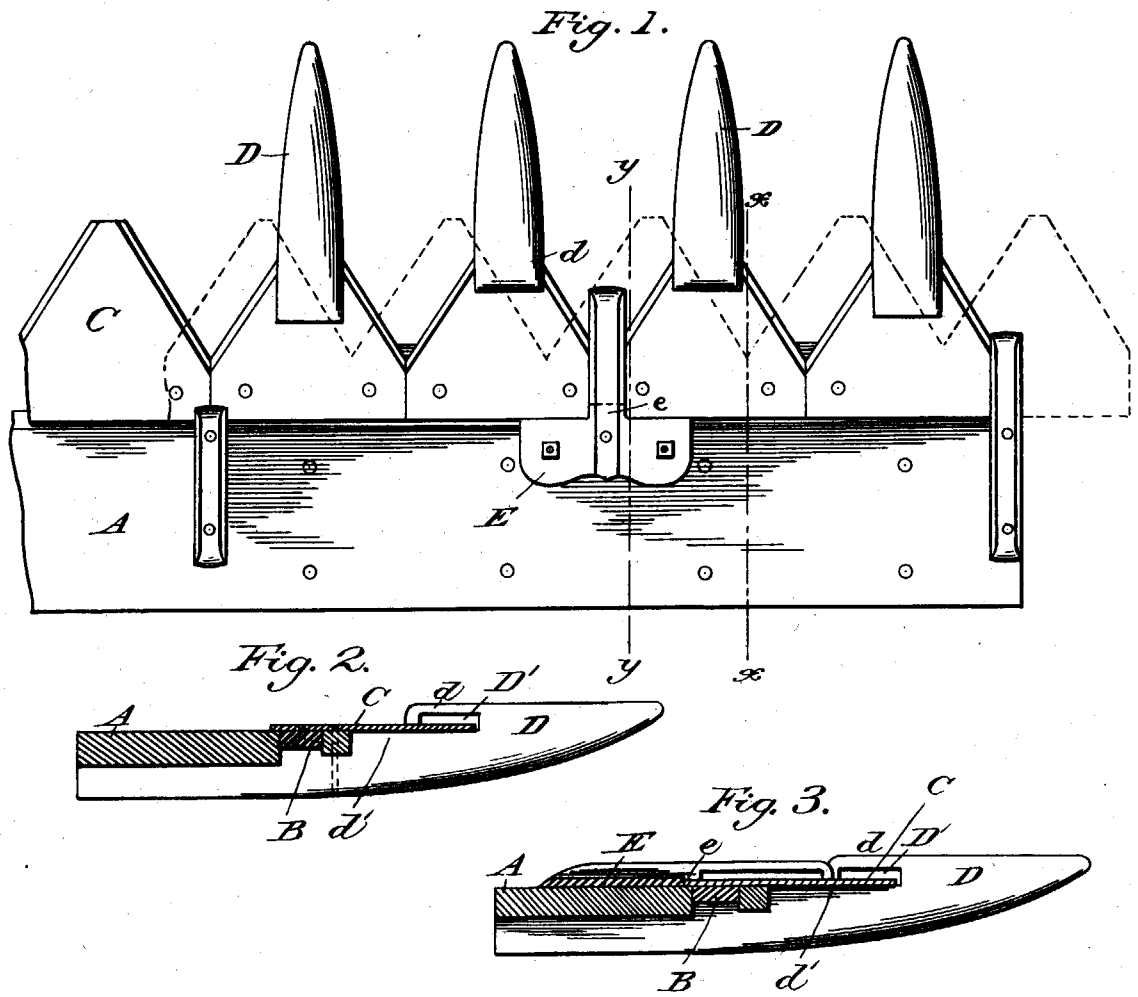
Witnesses:
Samuel B Lamb
Charlie B Lamb
Inventor:
William S Fox
N. PETERS, Photo-Lithographer, Washington, D. C.

UNITED STATES PATENT OFFICE.

WILLIAM S. FOX, OF SHORT CREEK, OHIO.

ATTACHMENT FOR MOWING-MACHINES.

SPECIFICATION forming part of Reissued Letters Patent No. 10,990, dated March 12, 1889.

Original No. 359,351, dated March 15, 1887. Application for reissue filed March 15, 1888. Serial No. 267,285.

*To all whom it may concern:*

Be it known that I, WILLIAM S. FOX, a citizen of the United States, residing at Short Creek, in the county of Harrison and State of Ohio, have invented certain new and useful Improvements in Attachments for Mowing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to cutting apparatus for harvesting and mowing machines, and has for its object to obviate and prevent any vertical movement of the cutters or cutter-sections and hold them down upon the knife portion of the guard-fingers and secure a more perfect shear cut.

The improvements consist in the novel features hereinafter more fully described, and shown in the annexed drawings, in which—

Figure 1 is a plan view of a cutting apparatus provided with my improvements. Fig. 2 is a sectional view on the line $x\ x$ of Fig. 1. Fig. 3 is a sectional view on the line $y\ y$ of Fig. 1.

The finger-bar A, the cutter-bar B, and the cutters C are of old and well-known construction. The guard-fingers D are of usual arrangement, and have the ordinary slot, D′, forming the overhanging guard $d$, through which the cutters work in the well-known manner.

My invention consists in having the rear ends of the guard-fingers $d$ turned down, so as to bear upon the top of the cutter-sections and hold them down upon the cutting-face $d'$ of said guard-fingers while under said rear ends of the guard-fingers so turned down, in connection with the keepers E, which are located intermediate the guard-fingers. These keepers are attached to the finger-bar in the rear of the cutter-bar in the usual manner; but that portion extending over the cutter-sections extends much farther forward than those heretofore in use, and have their front ends turned down, and bear upon the cutter-sections near their front ends and hold them down upon the cutting-face $d'$ of the guard-fingers while passing beneath the ends of said keepers so turned down. By bearing upon the cutters near their front ends is meant at any place between the front ends and the center of the cutters; but it is found preferable to have said overhanging guards and keepers bear upon the cutters about one-third the distance from their front to their rear edges. A portion, $e$, depending from the rear end of that portion of the keeper extending over the cutter-sections bears upon said cutter-sections at their rear edges, and holds the rear edges of the cutter-sections and cutter-bar against vertical displacement. From this it will be seen that the keepers bear upon the cutter-sections at two points, the one in front of the cutter-bar and the other directly over the rear edge of the same.

The keepers E, having their front ends turned down, are arranged relative to the guard-fingers having their rear ends turned down, so that the one or the other will at all times bear upon the cutter-sections and hold them down upon the cutting-face $d'$ of the guard-fingers and prevent any vertical play thereof. By this arrangement the cutter-sections being held closely down to the cutting-faces of the guard-fingers, said faces will be kept flat and true much longer than by any means heretofore devised.

These improvements can be applied to any cutting apparatus in common use, and there may be as many of the keepers and guard-fingers with the overhanging portions bent down as occasion may require; and in the foregoing description I do not wish to be understood as requiring the rear ends of all the guard-fingers turned down, as in practice it has been found sufficient if only a few are so constructed and located at intervals throughout the length of the finger-bar, and for this reason in Fig. 1 two of the guard-fingers only are thus shown.

The keepers E being located intermediate between two guard-fingers having their rear ends bent down, the bent ends of the guard-fingers and the keepers are substantially in line, as shown, so that the cutter-sections will be held down at both edges when about to pass from beneath one guard-finger, or when in the act of passing beneath the other guard-finger, as will be readily appreciated.

Having thus described my invention, what I claim, and desire to secure by Letters Patent, is—

1. In a harvester cutting apparatus, the combination of the cutters, the guard-fingers D, having the rear ends of their overhanging portions *d* turned down and bearing upon the cutters near their front ends, and the keepers E intermediate the guard-fingers fixed to the finger-bar and having their front ends extended, turned down, overhanging, and bearing upon the cutters near their front ends, and a portion bearing upon their rear edges, substantially as and for the purposes set forth.

2. In a harvester cutting apparatus having the usual form of finger-bar A, cutter-bar B, and cutters C, the keepers E intermediate the guard-fingers attached to the finger-bar and having their front ends extended, turned down, and bearing upon the cutters near their front ends, and a portion, *e*, bearing upon said cutters on their rear edges, as and for the purposes set forth.

3. In a harvester cutting apparatus, the combination of the cutters, the guard-fingers D, having their overhanging portions *d* turned down and bearing upon the cutters near their front ends, and the keepers E intermediate the guard-fingers, attached to the finger-bar and bearing upon the cutters near their front ends, to prevent vertical vibration of the front ends of the cutters, substantially as shown and specified.

In testimony whereof I affix my signature in presence of two witnesses.

WILLIAM S. FOX.

Witnesses:

AMON LEMMON,
H. G. FORKER.